(12) United States Patent
Owenby et al.

(10) Patent No.: US 7,380,733 B2
(45) Date of Patent: Jun. 3, 2008

(54) PLURAL BIN METERING SYSTEM

(75) Inventors: Steve Owenby, Blairsville, GA (US); Michael Chipman, Cornelia, GA (US)

(73) Assignee: Barron & Brothers International, Cornelia, GA (US)

( * ) Notice: Subject to any disclaimer, the term of this patent is extended or adjusted under 35 U.S.C. 154(b) by 0 days.

(21) Appl. No.: 11/490,813

(22) Filed: Jul. 21, 2006

(65) Prior Publication Data
US 2007/0034721 A1 Feb. 15, 2007

Related U.S. Application Data

(60) Provisional application No. 60/701,150, filed on Jul. 21, 2005.

(51) Int. Cl.
*A01C 7/06* (2006.01)
(52) U.S. Cl. ............... 239/656; 239/667; 239/673; 239/682
(58) Field of Classification Search ............ 239/656, 239/667, 670, 673, 676, 677, 682, 684; 222/145.7, 222/608
See application file for complete search history.

(56) References Cited

U.S. PATENT DOCUMENTS

| | | | | |
|---|---|---|---|---|
| 2,946,597 | A | * | 7/1960 | Simonsen ............... 239/684 |
| 3,073,606 | A | | 1/1963 | Hurt |
| 3,377,030 | A | * | 4/1968 | Swenson ............... 239/656 |
| 3,685,468 | A | * | 8/1972 | Paige et al. ............ 239/656 |
| 4,106,703 | A | * | 8/1978 | Magda ................ 239/677 |
| 4,162,766 | A | | 7/1979 | Ten Broeck et al. |
| 4,296,695 | A | | 10/1981 | Quanbeck |
| 4,405,089 | A | * | 9/1983 | Taylor ................. 239/673 |
| 4,422,562 | A | | 12/1983 | Rawson |
| 4,630,773 | A | | 12/1986 | Ortlip |
| 4,852,809 | A | | 8/1989 | Davis et al. |
| 5,052,627 | A | | 10/1991 | Balmer |
| 5,355,815 | A | | 10/1994 | Monson |
| RE35,100 | E | | 11/1995 | Monson et al. |
| 5,757,640 | A | | 5/1998 | Monson |
| 5,870,686 | A | | 2/1999 | Monson |
| 5,913,915 | A | | 6/1999 | McQuinn |
| 5,950,933 | A | | 9/1999 | Balmer |
| 6,089,743 | A | | 7/2000 | McQuinn |
| 6,122,581 | A | | 9/2000 | McQuinn |
| 6,193,175 | B1 | * | 2/2001 | Andersson et al. ......... 239/656 |
| 6,198,986 | B1 | | 3/2001 | McQuinn |
| 6,230,091 | B1 | | 5/2001 | McQuinn |
| 6,817,551 | B2 | | 11/2004 | Williams et al. |

* cited by examiner

*Primary Examiner*—Steven J Ganey
(74) *Attorney, Agent, or Firm*—Thomas, Kayden, Horstemeyer & Risley LLP; Todd Deveau

(57) ABSTRACT

A plural bin metering system for broadcasting material ingredients contained therein over a ground surface. The system includes at least two material ingredient hoppers, each of the hoppers having a material ingredient discharge port. At least one of the material ingredient hoppers includes a variably controllable metering unit associated therewith for variably controlling the discharge of material ingredients therefrom independently from the rate of discharge of material ingredients from the other material ingredient hopper. A conveyor is disposed below the hoppers for receiving material ingredients discharged from the hoppers, and a material ingredient broadcasting device disposed off of one end of the conveyor for receiving material ingredients conveyed thereon, received from the hoppers, for broadcasting the material ingredients over a ground surface. The metering unit is capable of metering material ingredients from its associated hopper at ultra low rates. In a preferred embodiment the system has three hoppers for broadcasting, for example fertilizer across a field in one pass.

40 Claims, 6 Drawing Sheets

SECTION A-A
FIG. 3

FIG. 5

PLURAL BIN METERING SYSTEM

CROSS-REFERENCE TO RELATED APPLICATIONS

This application claims benefit of and priority to U.S. Provisional Patent Application No. 60/701,150 filed on Jul. 21, 2005, which is incorporated by reference in its entirety.

FIELD OF THE INVENTION

The present invention relates to a plural bin metering system of the type used to mix and distribute a plurality of material ingredients, such as dry bulk material, and broadcast them over a ground surface such as an agricultural field.

BACKGROUND OF THE INVENTION

It is generally known to provide a plural bin system for mixing multiple ingredients, such as fertilizer and fertilizer supplements, and spreading or broadcasting the mixture over a ground surface. For example, U.S. Pat. No. 3,073,606 to Hurt discloses an apparatus including a multiplicity of bins which are separated from each other for carrying material ingredients with transversely oriented metering screw auger conveyors disposed underneath the bins such that equal amounts of ingredients are discharged from the bins. The discharge of each of the ingredients from the transverse screw auger conveyors is equally divided by four longitudinally extending screw auger conveyors that discharge the ingredients onto a transverse screw auger conveyor at the rear of the apparatus. The mechanical complexity of this system has many moving parts requiring substantial maintenance and operating costs. In addition, this system does not have the ability to easily vary the spread rates of the different materials.

U.S. Pat. No. 6,817,551 to Williams, et al. discloses a convertible plural bin and conveyor material spreader. In this device, the material bin may be converted from a single bin to a plural bin apparatus and vice versa by the insertion or removal of a self-contained bin having its own separable conveyor. Thus, each bin has its own conveyor for discharging material ingredients from the bin, with the conveyors disposed one over the other.

In spite of the existence of these devices, there remains a need for equipment that is capable of spreading a plurality of different materials/ingredients at independently varying rates that is more economical than existing devices. There also exists a need for spinner spreader equipment that is capable of spreading a plurality of different material ingredients with some at ultra low rates.

SUMMARY

The plural bin metering system of the present disclosure is designed to meet the aforementioned needs. More particularly, the present plural bin metering system provides a system that has the aforementioned capability that costs less than existing devices and is less expensive to maintain. It also allows for simultaneously spreading multiple materials at different discharge rates and at either independently straight (fixed) rates or independently varying rates capable of combined material ingredient distribution rates in excess of 600 lbs./acre and a distribution of at least one of the material ingredients as low as sub 20 lbs./acre.

In an exemplary embodiment of the present disclosure, a plural bin metering system and method is provided for broadcasting material ingredients contained therein over a ground surface having at least two material ingredient hoppers, preferably at least three hoppers, each of the hoppers having a material ingredient discharge port. At least one of the material ingredient hoppers has a variably controllable metering unit associated therewith for variably controlling the discharge of material ingredients therefrom independent from the rate of discharge of material ingredients from the other material ingredient hopper. A conveyor is disposed below the hoppers for receiving material ingredients discharged from the hoppers, and a material ingredient broadcasting device disposed off of one end of the conveyor for receiving material ingredients conveyed thereon, received from the hoppers, and broadcasting the material ingredients over a ground surface.

In another non-limiting embodiment of the present disclosure, the system and method is designed to spread three different material ingredients over a ground surface. The plural bin metering system of this embodiment includes a primary material ingredient hopper and one or more smaller secondary material ingredient hoppers supported by a frame or rails. Each hopper can have associated with it a material metering device 4 independently controlling the rate of metering or discharge of material ingredients held within its associated hopper with respect to the discharge of material ingredients from the other hoppers. The metering device of at least one, if not all, of the secondary material ingredient hoppers is controllable allowing the rate of discharge of material ingredients from the secondary hopper to be varied as desired, particularly at ultra low rates.

A take away conveyor is disposed below and extends rearwardly of the primary ingredient hopper for receiving materials discharged from the primary ingredient hopper and subsequently from the secondary material ingredient hoppers. The one or more secondary material ingredient hoppers are disposed rearward of the main ingredient hopper and above the take away conveyor. The metering device(s) of the secondary material ingredient hopper(s) are also disposed rearward of the primary material ingredient hopper and above the take away conveyor. Material ingredients discharged from the secondary ingredient hopper(s) are discharged onto the take away conveyor rearwardly of the discharge port of the primary material ingredient hopper. In a non-limiting example two secondary material ingredient hoppers are provided. Each of the secondary material ingredient hoppers is provided with an independently variably controllable metering device, thereby allowing variable control over the mixture of ingredients discharged from the system.

The take away conveyor leads to a device for receiving the material ingredients discharged from the hoppers and spreading or broadcasting the material ingredients over a ground surface. The spreader includes one or more horizontally positioned spinners disposed below the discharge end of the main material ingredient conveyor. Each spinner is rotated by a variably controllable motor for controlling the rate of rotation of the spinner and therefore the broadcast pattern of the ingredients over the ground surface.

Means are provided for individually controlling the discharge rates of material ingredients from each of the hoppers as well as the discharge rate of the combined material ingredients from all of the hoppers spread or broadcast over a ground surface. Each hopper can have its own individual metering device for controlling the rate of discharge of material ingredients from the hopper independently of the rate of discharge of material ingredients from the other hoppers. Additionally, the rate at which the combined material ingredients are discharged is controlled by controlling the rate at which the take away conveyor operates either alone or in conjunction with controlling the rate of rotation of the spinners. In this manner, both the ratio of material ingredients can be controlled as well as the overall discharge rate of the combination of material ingredients.

Other bin metering systems, devices, features and advantages of the disclosed system will be or become apparent to one with skill in the art upon examination of the following drawings and detailed description. It is intended that all such additional systems, devices, features, and advantages be included within this description, be within the scope of the present invention, and be protected by the accompanying claims.

BRIEF DESCRIPTION OF THE DRAWINGS

Many aspects of the disclosed plural bin metering system can be better understood with reference to the attached drawings, FIGS. 1-6. The components of the drawings are not necessarily to scale, emphasis instead being placed on clearly illustrating the principles of the present invention. Moreover, in the drawings, like reference numerals do not need corresponding parts throughout the several views.

DESCRIPTION OF THE EXEMPLARY EMBODIMENT

Figure 1:
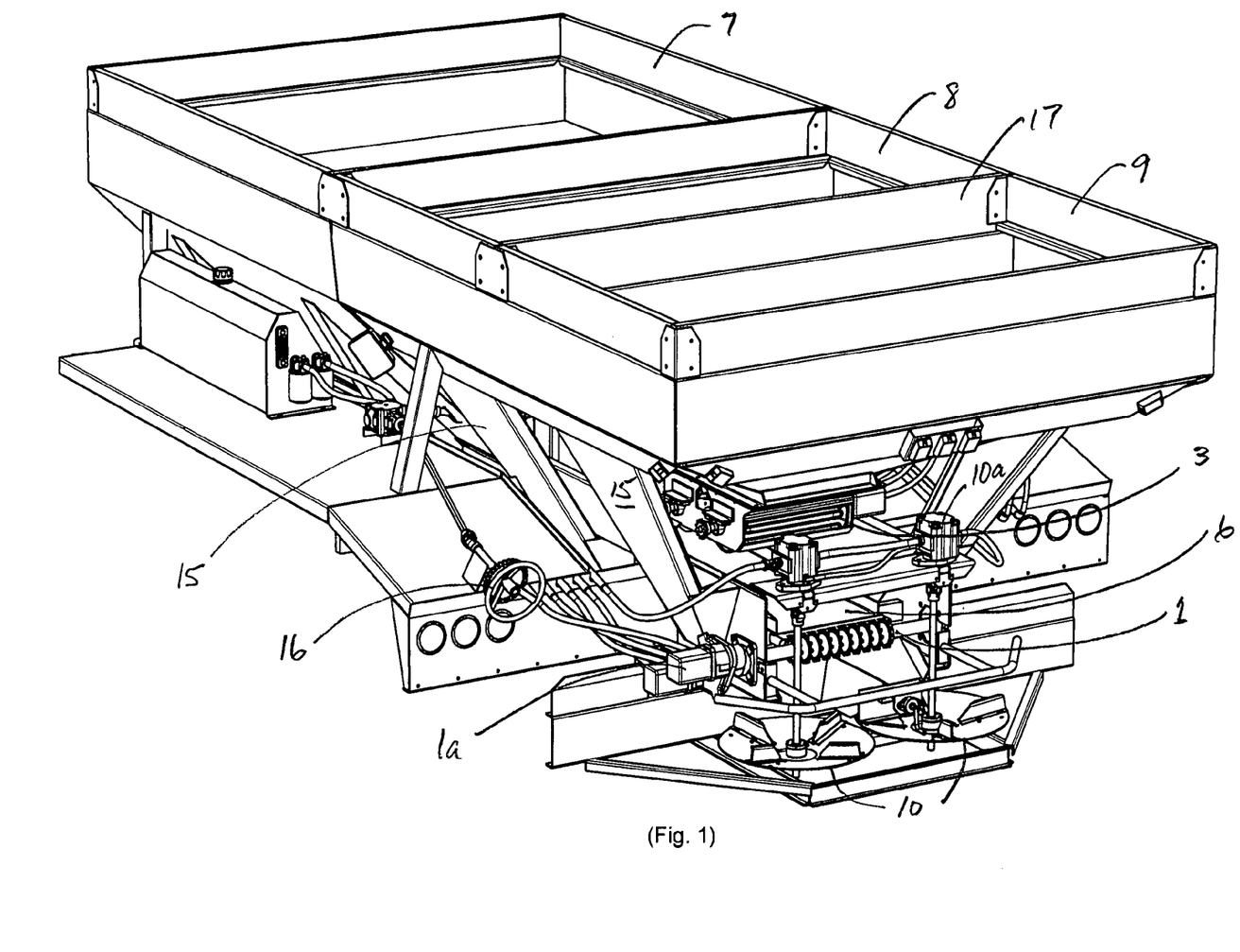
FIG. 1 is a perspective view of an exemplary embodiment of the plural bin metering system of the present disclosure, taken from the rear of the system.
Figure 2:
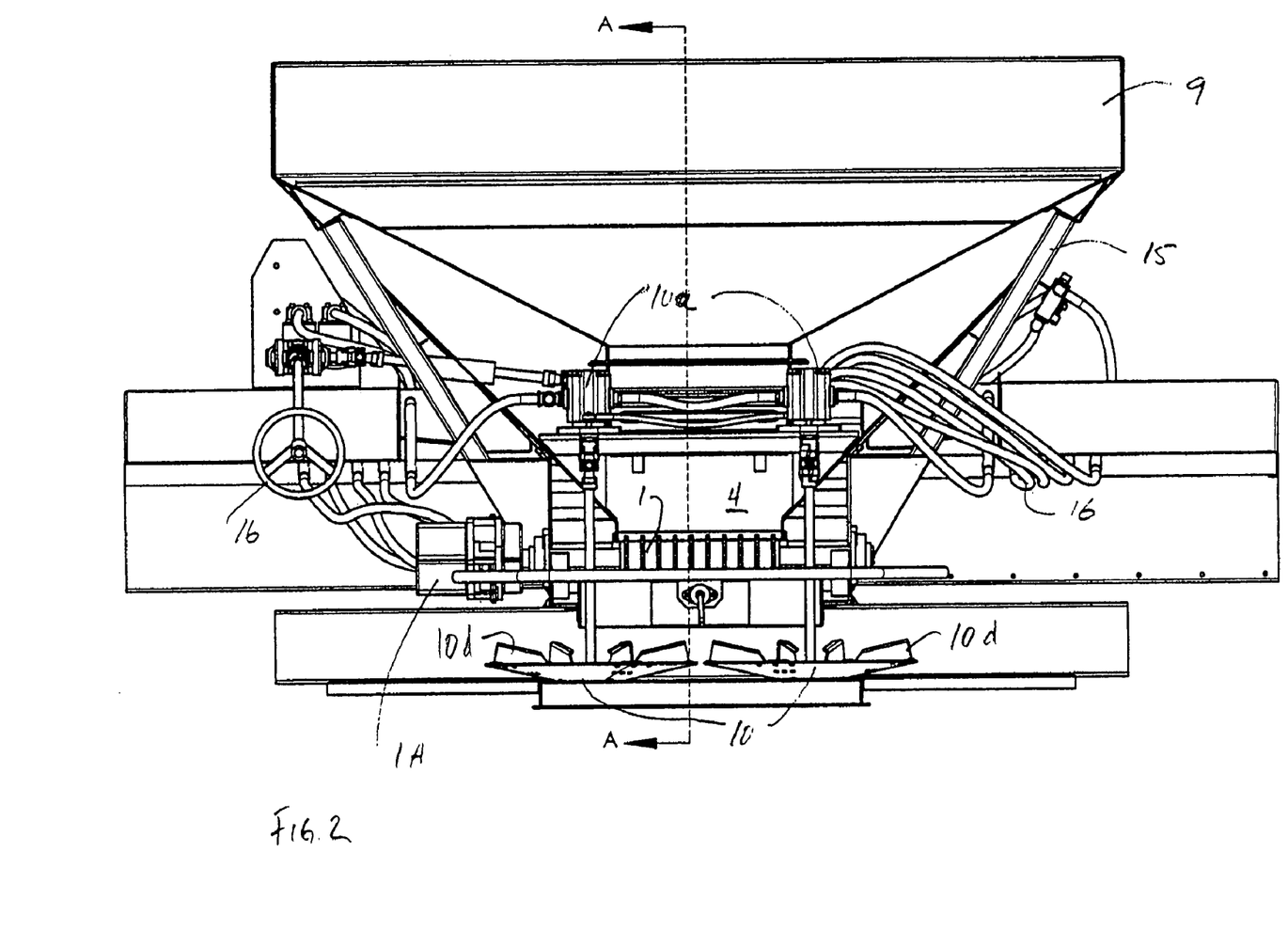
FIG. 2 is a rear elevational view of the system of FIG. 1.

Referring more specifically to the drawings in which like reference numerals refer to like elements throughout the several views, an exemplary non-limiting embodiment of the plural bin metering system of the present disclosure is illustrated in FIGS. 1-6. Referring to FIGS. 1 and 2, the plural bin metering system of the present disclosure includes a primary material ingredient hopper 7 and one or more secondary material ingredient hopper(s). In an exemplary embodiment illustrated two secondary material ingredient hoppers 8, 9 are provided. The secondary material ingredient hoppers 8, 9 are positioned rearwardly of primary material ingredient hopper 7. The primary and secondary hoppers are supported by a frame including rails 15. In the embodiment illustrated, the hoppers are positioned in series, longitudinally along the frame. Each hopper has generally converging walls leading to a discharge port, allowing for gravitational feed and discharge of material ingredients contained within each respective hopper. The hoppers are generally designed for holding and discharging dry, bulk granular materials such as but not limited to fertilizer, fertilizer supplements, herbicides, insecticides, fungicides, soil pH adjusting materials, micronutrients, and the like. The hoppers are fixed to rails 15 and are not selectively removable.

The secondary material ingredient hoppers 8, 9 include a metering transition box 4 into which their respective ingredients flow. The ingredients from the metering transition box 4 are discharged to take away conveyor 6, such as a bed chain conveyor or chain mesh conveyor, that directs the material ingredients to rear roller 1. Rear roller 1 serves to deliver the material ingredients to one or more spinners 10 that serve to distribute or broadcast the material ingredients over a ground surface, such as an agricultural field, food plots within wooded areas, turf and golf course applications and vineyards. In the exemplary embodiment illustrated two spinners are provided.

Rear roller 1 is operated by a gear case and hydraulic motors 1a. Rear roller 1 serves to drive the take away conveyor 6. Thus, adjusting the speed of rotation of roller 1 by hydraulic motor 1a serves to control the speed of the take away conveyor 6.

Figure 3:
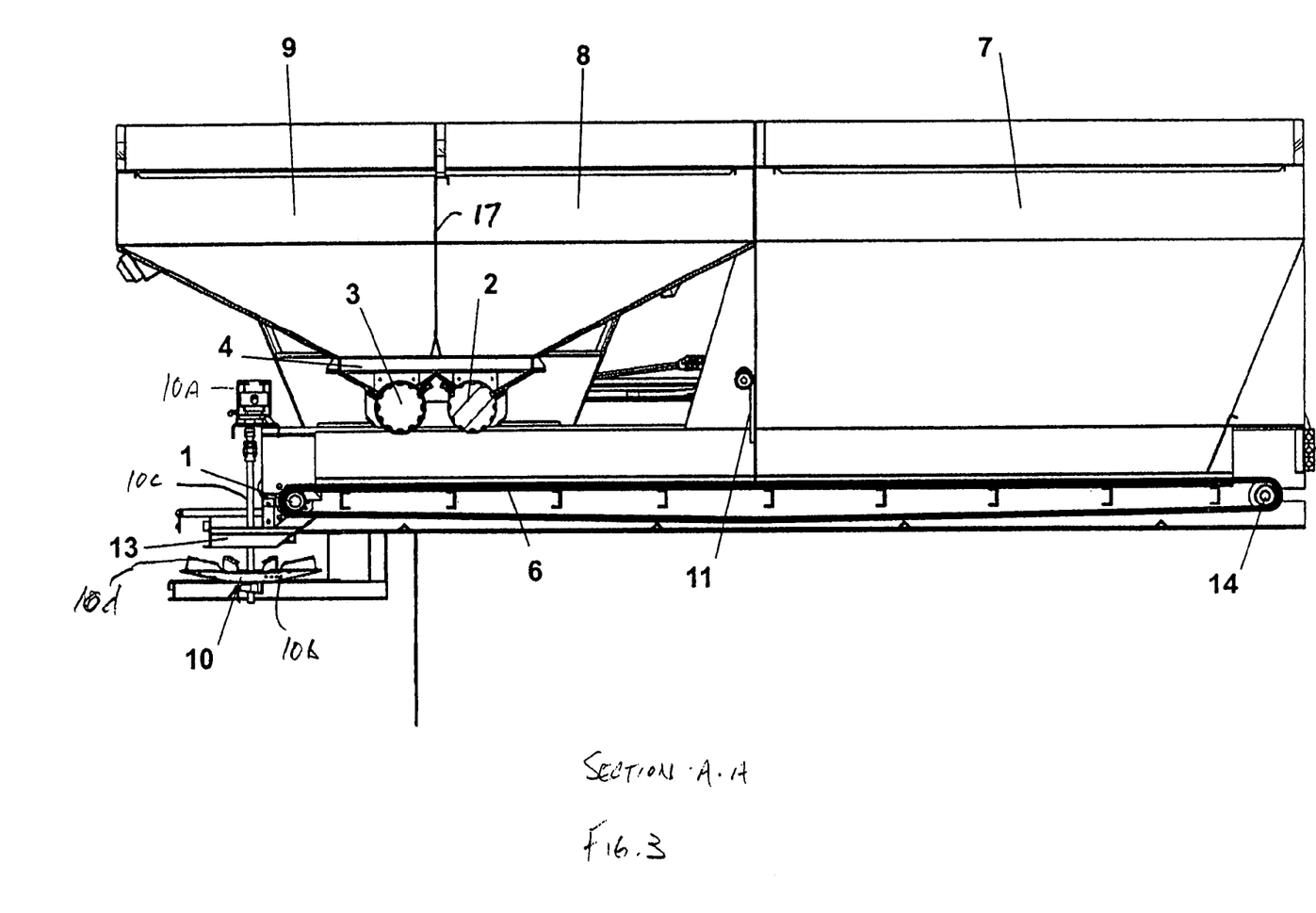
FIG. 3 is a right side elevational view taken along section A-A of the system illustrated in FIG. 2.

In FIGS. 2 and 3, spinners 10 are operated by drive motors 10a. The drive motors may be variable speed motors allowing for adjustment of the rate of operation of the spinners 10 for distribution or broadcast of the material ingredients from the system.

As illustrated spinners 10 are in the form of disks 10b positioned below and off the end of take away conveyor 6. The disks 10b may be flat or, preferably, concave. Each disk 10b is mounted on generally vertically disposed shaft 10c with the disk 10b positioned generally parallel to the surface on which the material ingredients are to be distributed. Disks 10b are designed for rotation about shafts 10c. Drive motors 10a are operably connected to shafts 10c for controlling the rate of rotation of spinners 10 and thereby the rate of distribution of material ingredients from spinners 10 over a ground surface below. Disks 10b may have upwardly projecting fins 10d to assist in distributing material ingredients from spinners 10.

FIG. 3 is a view of the system of FIGS. 1 and 2 taken along section lines A-A from the right side of the system of FIG. 2. This figure illustrates a side elevational cross-sectional view of hoppers 7-9 and their associated material ingredient discharge devices. Primary material ingredient hopper 7 includes gate 11 for controlling the rate of discharge of material therefrom. Gate 11 may be lowered to near closed position for minimal discharge of material from hopper 7 (as illustrated), or alternatively may be fully opened, or positioned somewhere between fully opened and fully closed. In an exemplary embodiment gate 11 is positioned by manual settings. The position of gate 11 along with the speed of take away conveyor 6 affects the rate of discharge of material from the primary hopper 7.

Secondary material ingredient hoppers 8, 9 are positioned rearwardly of primary ingredient hopper 7. Their converging walls lead to metering transition box 4 that includes metering rollers 2, 3, respectively.

Take away conveyor 6 is positioned below primary ingredient hopper 7 for receiving materials discharged through gate 11 from the hopper. In an exemplary embodiment conveyor 6 extends longitudinally underneath primary ingredient hopper 7 and beyond gate 11 to the rear of rails 15. Metering box 4 including metering rollers 2, 3 is positioned longitudinally along the frame, rearward of gate 11 and above conveyor 6. Thus, ingredients discharged by metering rollers 2, 3 from secondary material ingredient hoppers 8, 9 are received by conveyor 6. When material ingredients have been discharged from hopper 7 onto conveyor 6, ingredients discharged from secondary material ingredient hoppers 8, 9 are discharged on top of the primary ingredients from hopper 7 onto the same conveyor 6. Conveyor 6 directs the combined material ingredients to rear roller 1 which discharges ingredients to flow divider 13 and onto spinners 10.

Figure 4A:
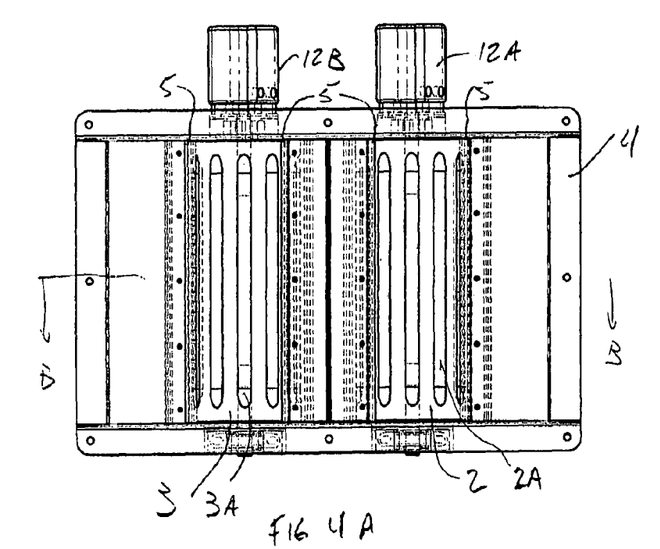
FIGS. 4a-d are various views of the metering devices of the secondary hoppers of the system of FIG. 1.
Figure 4B:
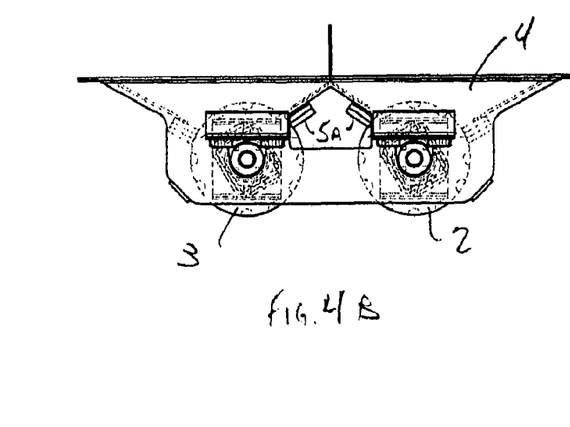
Figure 4C:
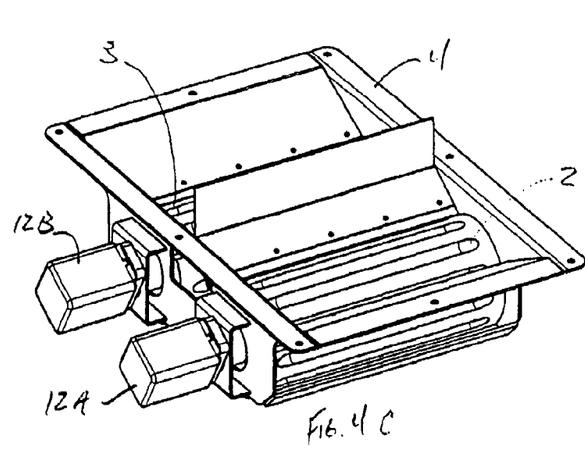
Figure 4D:
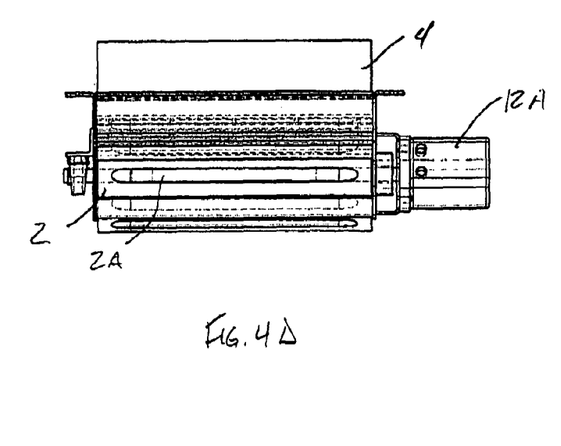
Figure 5:
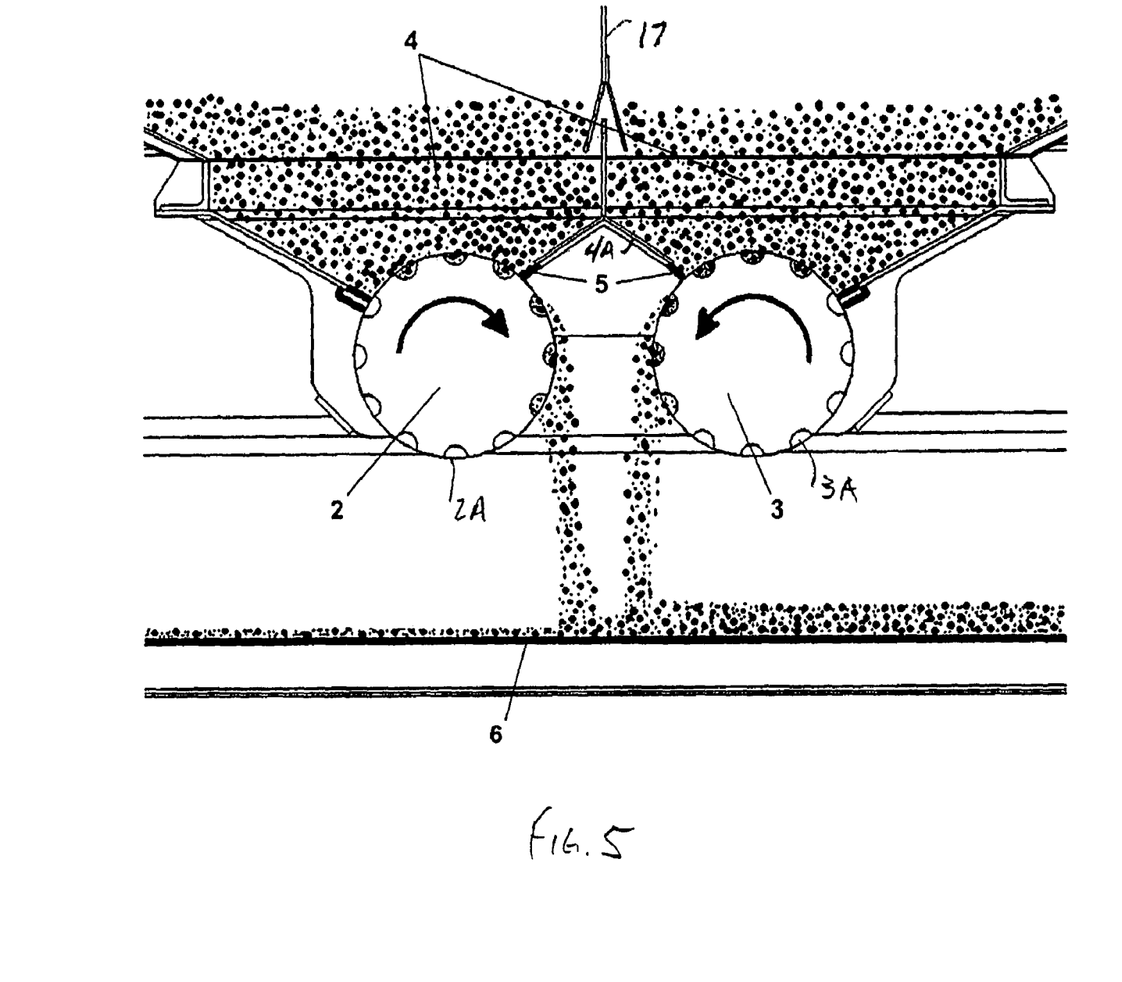
FIG. 5 is a sectional elevational view of the metering devices illustrated in FIGS. 4a-d taken along section B-B.

Top, perspective, side and rear views of metering transition box 4 and metering rollers 2, 3 are illustrated in FIGS. 4*a-d*. Each metering roller includes an associated drive motor 12*a, b* and surface recesses 2*a*, 3*a*. Drive motors 12 *a, b* can be variable speed motors for adjusting the speed of individual rotation of each of the rollers 2, 3 at independent rates. The metering roller recesses 2*a*, 3*a* are sized and designed to receive granular material ingredients to aid and control the rate of their discharge from their respective hopper. In an exemplary embodiment recesses 2*a*, 3*a* extend longitudinally in the surface of rollers 2, 3. One skilled in the art would appreciate that other forms and shapes of recesses can be provided in the surface of rollers. Roller brushes 5 are positioned to wipe the surface of rollers 2, 3 as the rollers rotate thereby aiding in controlling the rate of discharge of ingredients from hoppers 8, 9. Alternatively, rubber or plastic strips 5*a* (See FIG. 4*b*) may be provided in place of brushes 5. FIG. 4*b* shows a side elevational cross-sectional view along section B-B of FIG. 4*a*. As illustrated in FIG. 5, divider 4*a* including downwardly angled walls is positioned between rollers 2, 3 to aid in diversion of the material ingredients towards rollers 2, 3. Divider 4*a* is positioned below a fixed, stationary dividing wall 17 creating the separate secondary material ingredient hoppers 8, 9. Dividing wall 17 is not removable.

As shown in FIG. 5, recesses 2*a*, 3*a* in metering rollers 2, 3 aid in controlling the discharge of material ingredients from their respective hoppers onto conveyor 6. In an exemplary embodiment, metering rollers 2, 3 are counter rotated towards each other, though they need not be. Their design allows for metering of the secondary material ingredients at precisely controlled rates and, in particular, allows for normal to ultra low spread rates (i.e., sub 75 lbs./acre) of the secondary material ingredients that is required of many micro-nutrients. The metering roller design also distributes the secondary material ingredients uniformly across the width of take away conveyor 6, thus evenly delivering the secondary ingredients ultimately to spinner(s) 10 resulting in a uniform spread pattern onto the applied ground surface. Their design also allows the secondary material ingredient hoppers 8, 9 to be in a fixed position at the rear most point above take away conveyor 6, closest to spinners 10. Therefore, when a material ingredient rate change is inputted, there is a minimal distance between the drop point of the ingredients from the secondary hoppers 8, 9 and the discharge end of take away conveyor 6, minimizing the delay in effectiveness of the inputted rate change. Their design further enables either or both of the secondary hoppers 8, 9 to be stopped, completely shutting off the discharge of the secondary ingredients. The simplicity of metering rollers 2,3, metering transition box 4 and the configuration of the secondary hoppers 8, 9 minimizes maintenance and operating costs. For example, the design illustrated in FIGS. 4*a-d* allows the metering rollers 2,3 to be removed for maintenance or modification. For example, the design illustrated in FIGS. 4*a-d* allows the metering rollers 2,3 to be easily removed for maintenance or modification.

Figure 6:
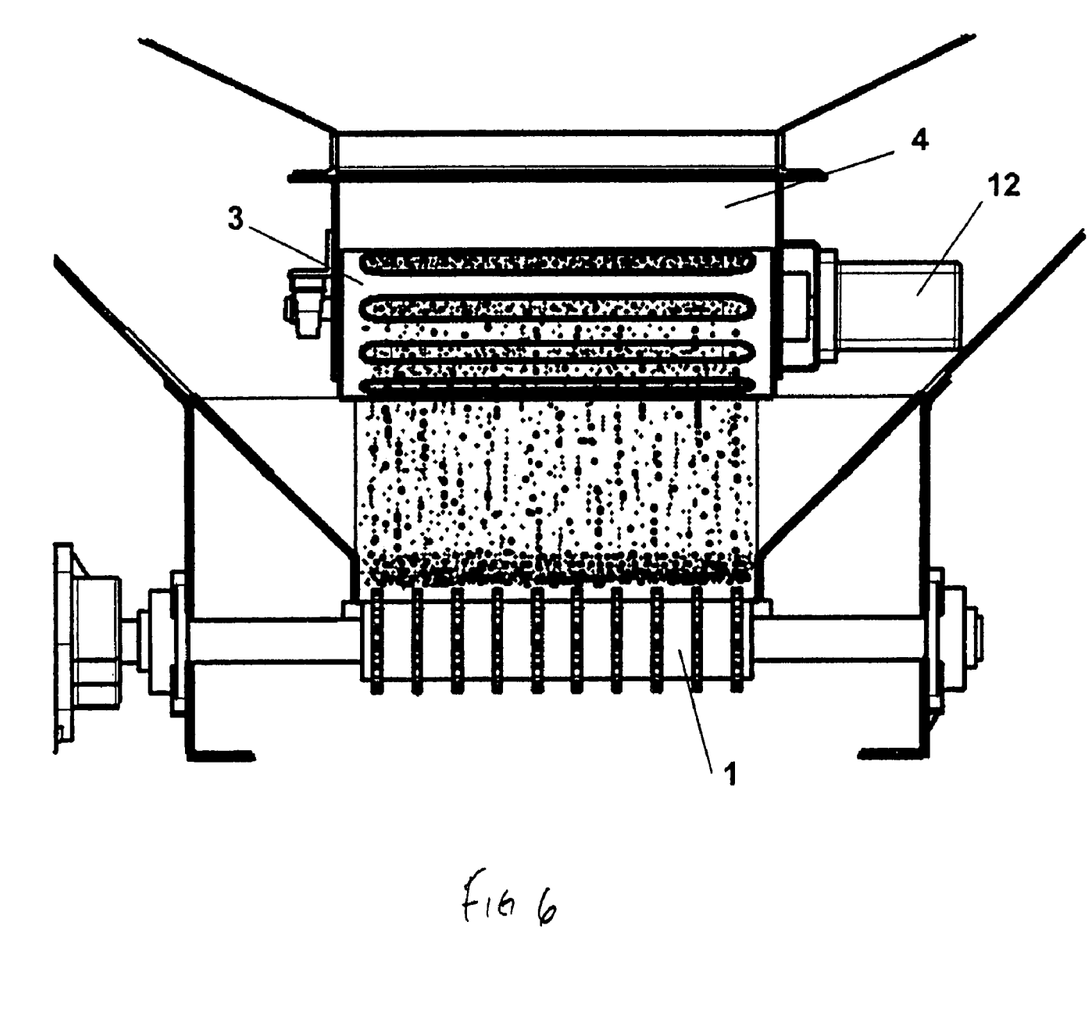
FIG. 6 is a rear elevational close-up view of the metering devices of the secondary material ingredient hoppers of FIG. 5.

FIG. 6 illustrates a rear elevational view of metering roller 3 associated with metering box 4 and towards the rearwardly most positioned secondary material ingredient hopper 9. Material ingredients discharged from the hoppers onto conveyor 6 are fed to rear roller 1. Spinners 10 are fixed in position in relation to rear roller 1. Flow divider 13 is positioned between rear roller 1 and spinners 10 for directing the flow of the ingredients from conveyor 6 and rear roller 1 onto spinners 10.

Accompanying the plural bin metering system typically would be either a simplified full hydraulic control system or an electronic control system, either of which is available from numerous sources. These systems are intended to control and adjust the discharge rate of the ingredients from the respective hoppers. These controls control drive motor 1*a* for roller 1 that drives take away conveyor 6 and discharges materials to the spinners 10, and in some cases may also control drive motors 10*a* that serve to rotate spinners 10. Additionally, these controls can control drive motors 12*a, b* that control the rate of rotation of metering rollers 2, 3 of the secondary material ingredient hoppers 8, 9. Thus, it can be seen the controller can control the rate of discharge of ingredients from the secondary material ingredient hoppers 8, 9 and thus the ratio of the mixture of ingredients from these secondary hoppers. Further, by controlling the rate of discharge of ingredients from secondary material ingredient hoppers 8, 9, the ratio of secondary ingredients to the amount of primary ingredients discharged from hopper 7 can be controlled. By controlling the rate of rotation of rear roller 1, the rate of rotation of metering rollers 2 and 3, and/or the position of gate 11 on primary hopper 7, the overall rate of discharge of ingredients from hoppers 7, 8 and 9 and the rate of broadcast of these ingredients onto a ground surface can be controlled.

Electronic controls are available for controlling the system and can be supplied by many suppliers of computerized rate controllers, provided by companies such as Trimble, Ag-Chem Equipment Co., Inc., Mid-Tech, Raven Industries, or Micro-Track. Exemplary controls include the control systems disclosed in U.S. Pat. RE 35,100, U.S. Pat. No. 6,198,986, and U.S. Pat. No. 6,089,743, each of which is incorporated by reference as if fully set forth herein.

It can be seen from the above description that a plural metering system is provided that allows the operator, with the aid of any one of numerous control systems, to spread multiple material ingredients at independently varying or fixed rates. Typically farmers or commercial applicators must apply three material ingredients, such as N.P.K. (nitrogen, phosphorous and potassium), or at times two of these three and the third ingredient being one or more micro-nutrients such as trace elements (for example, boron, magnesium and/or sulfur). This system allows the operator to make one trip across a field and accurately spread three different materials, thus saving time and associated costs. In addition to the advantage of delivering these materials at once, the metering rollers enable materials (from secondary hoppers 8 and/or 9) to be spread at ultra low rates (i.e., sub 75 lb./acre). Further, the controls allow for different rates of discharging and broadcasting material ingredients at different rates at different locations on the field.

The plural bin metering system can have a combined discharge rate of the material ingredients in excess of 200 lbs./acre, even in excess of 600 lbs./acre. In an exemplary embodiment of the plural bin metering system of FIG. 1 the primary hopper 7 had a 5-ton capacity and each of the secondary hoppers a 2-ton capacity. The system was set to discharge an average of 200 to 300 lbs./acre of nitrogen from the primary hopper 7, an average of 75 to 80 lbs./acre of potassium from one of the secondary hoppers and approximately 50 lbs./acre of micro-nutrients from the other of the secondary hoppers. Other discharge rates can be set for discharging material ingredients from the hoppers. One or both of the secondary hoppers can be set to discharge their respective material ingredients at ultra low rates, i.e., sub 75 lbs./acre. For example, each secondary hopper can be set to discharge its respective material ingredients at or below 50 lbs./acre or even below 20 lbs./acre.

It should be understood that the plural bin metering system of the present disclosure is designed for placement on a mobile, wheeled frame, pulled for example by a tractor. One skilled in the art will recognize that the ultimate discharge rate which material ingredients are broadcast or spread over a ground surface will depend upon the speed of the tractor and mobile frame. For example, if the plural bin metering system is driven at 15 miles per hour, spreading 65 lbs. of fertilizer 80 feet wide, the main hopper 7 will spread approximately 337 lbs./acre while the secondary hoppers 8 and 9 can be set to spread 147 lbs./acre between the two of them, for a total of 631 lbs./acre from all three hoppers. On the other hand, slowing the speed down to 5 miles per hour will triple the discharge rates of material ingredients per acre. Similarly, cutting the spread width to 60 feet instead of 80 feet will increase the discharge rate per acre by approximately 25%.

The broadcast pattern of the ingredients broadcast from spinners 10 can be fine tuned or adjusted by adjusting one or more of the rate of rotation of the spinners 10, the position of the flow divider 13 that diverts a portion of the discharge of ingredients to one spinner and another portion to the other spinner, and the position of the fins 10 on the spinners 10.

As can be seen from the aforementioned description, the discharge rates of material ingredients from each hopper are individually controllable with respect to the discharge rates of material ingredients from the other hoppers. For example, the discharge rate from the primary hopper 7 is controllable by the operation of gate 11 which controls the size of the discharge opening from primary hopper 7. The discharge rates of material ingredients from the secondary hoppers are controllable by metering box 4, and more particularly by the individual metering rollers 2 and 3, the speed of each being individually controllable through their associated variable speed motors 12a, b. The discharge rate or rate of take away of the combination of material ingredients discharged from each of the hoppers is controllable by controlling the speed at which take away conveyor 6 operates by roller 1.

The afore described plural bin metering system is but an exemplary embodiment of the present disclosure. Other embodiments may include as few as two hoppers or more than three hoppers for discharging their respective material ingredients onto the take away conveyor 6. Additionally, metering box 4 illustrated in FIG. 4c is shown to be a single box having a central partition for receiving material ingredients from the secondary hoppers 8 and 9 on either side of the divider 4a. Alternatively, each secondary hopper 8, 9 can have its own individual metering box 4. One or more spinners 10 can be provided.

It should be emphasized that the above-described embodiments of the present system, particularly any "preferred" embodiments are merely possible examples of implementations, merely set forth for a clear understanding of the principles of the invention. One skilled in the art will readily recognize that many variations and modifications may be made to the above-described embodiment(s) without departing substantially from the spirit and principles of the invention. All such modifications and variations are intended to be included herein within the scope of this disclosure and protected by the following claims.

The invention claimed is:

1. A plural bin metering system for broadcasting material ingredients contained therein over a ground surface comprising at least two material ingredient hoppers, each of the hoppers having a material ingredient discharge port; at least one of the material ingredient hoppers having a variably controllable metering unit associated therewith for variably controlling the discharge of material ingredients therefrom independently from the rate of discharge of material ingredients from the other material ingredient hopper;

a conveyor disposed below the hoppers for receiving material ingredients discharged from the hoppers;

and a material ingredient broadcasting device disposed off of one end of the conveyor for receiving material ingredients conveyed thereon, received from the hoppers, and broadcasting the material ingredients over a ground surface;

wherein the metering unit includes a roller disposed transversely to the conveyor, the roller having a plurality of spaced apart recesses in the surface of the roller for receiving the material ingredients to be discharged from its associated material ingredient hopper, the recesses being sized and spaced apart about the surface of the roller so as to provide uniform and constant discharge of the material ingredients from the recesses onto the conveyor.

2. The system of claim 1, wherein the broadcasting device includes means for variably adjusting the rate of distribution of material ingredients therefrom.

3. The system of claim 1, having at least three material ingredient hoppers arranged to discharge material ingredients therefrom onto the conveyor wherein at least two of the material ingredient hoppers each has associated therewith a metering unit that includes a roller disposed transversely to the conveyor, the roller having a plurality of spaced apart recesses in the surface of the roller for receiving the material ingredients to be discharged from its associated material ingredient hopper, the recesses being sized and spaced apart about the surface of the roller so as to provide uniform and constant discharge of the material ingredients from the recesses onto the conveyor.

4. The system of claim 3, wherein the hoppers are arranged longitudinally one after the other above and along the conveyor.

5. The system of claim 1, wherein the recesses of the roller are sized and spaced apart so as to meter material ingredients therefrom at or below 75 lbs/acre.

6. A plural bin metering system for broadcasting material ingredients contained therein over a ground surface comprising at least two material ingredient hoppers, each of the hoppers having a material ingredient discharge port; at least one of the material ingredient hoppers having a variably controllable metering unit associated therewith for variably controlling the discharge of material ingredients therefrom independently from the rate of discharge of material ingredients from the other material ingredient hopper;

a conveyor disposed below the hoppers for receiving material ingredients discharged from the hoppers;

and a material ingredient broadcasting device disposed off of one end of the conveyor for receiving material ingredients conveyed thereon, received from the hoppers, and broadcasting the material ingredients over a ground surface;

wherein the metering unit includes a roller disposed transversely to the conveyor, the roller having a plurality of spaced apart recesses in the surface of the roller for receiving the material ingredients to be discharged from its associated material ingredient hopper and the metering unit including a transition box having walls for diverting the material ingredients towards the roller, at least one of the walls further including a device to wipe the surface of the roller as the roller rotates within the metering unit.

7. The system of claim 1, wherein the recesses of the roller are sized and spaced apart so as to meter material ingredients therefrom at or below 20 lbs/acre.

8. The system of claim 1, wherein the recesses are spaced apart about the roller such that a first slot gradually discharges its contents as the roller is rotated about a longitudinal axis disposed transversely of the conveyor and before the first slot has completely discharged its material ingredients, a second slot has begun to discharge its material ingredients.

9. The system of claim 8, wherein the recesses have a concave radial shape.

10. The system of claim 8, wherein the roller delivers a uniform level of material ingredients onto the take away conveyor.

11. The system of claim 3, further including means for independently adjusting the speed of individual rotation of each of the rollers.

12. The system of claim 6, wherein the device to wipe the surface of the roller is a brush.

13. The system of claim 6, wherein the device to wipe the surface of the roller is a rubber or a plastic strip.

14. The system of claim 6, having at least three material ingredient hoppers arranged to discharge material ingredients therefrom onto the conveyor wherein at least two of the material ingredient hoppers each has associated therewith a metering unit that includes a roller disposed transversely to the conveyor, the roller having a plurality of spaced apart recesses in the surface of the roller for receiving the material ingredients to be discharged from its associated material ingredient hopper, the recesses being sized and spaced apart about the surface of the roller so as to provide uniform and constant discharge of the material ingredients from the recesses onto the conveyor.

15. The system of claim 14, wherein the hoppers are arranged longitudinally one after the other above and along the conveyor.

16. The system of claim 6, wherein the recesses of the roller are sized and spaced apart so as to meter material ingredients therefrom at or below 75 lbs/ acre.

17. The system of claim 6, wherein the recesses are spaced apart about the roller such that a first slot gradually discharges its contents as the roller is rotated about a longitudinal axis disposed transversely of the conveyor and before the first slot has completely discharged its material ingredients, a second slot has begun to discharge its material ingredients so as to provide uniform and constant discharge of the material ingredients from the recesses onto the conveyor.

18. The system of claim 17, wherein the roller is rotated about a longitudinal axis and the discharge of material ingredients from the recesses begins at a point above the longitudinal axis.

19. The system of claim 1, wherein the roller is rotated about a longitudinal axis and the discharge of material ingredients from the recesses begins at a point above the longitudinal axis.

20. The system of claim 3, wherein the roller is rotated about a longitudinal axis and the discharge of material ingredients from the recesses begins at a point above the longitudinal axis.

21. A plural bin metering system for broadcasting material ingredients contained therein over a ground surface comprising
at least two material ingredient hoppers, each of the hoppers having a material ingredient discharge port; at least one of the material ingredient hoppers having a variably controllable metering unit associated therewith for variably controlling the discharge of material ingredients therefrom independently from the rate of discharge of material ingredients from an other material ingredient hopper, the other material ingredient hopper providing a flow of the material ingredients through the system;
a conveyor disposed below the other material ingredient hopper for receiving material ingredients discharged from the other material ingredient hopper;
and a material ingredient broadcasting device disposed off of one end of the conveyor for receiving material ingredients conveyed thereon, and broadcasting the material ingredients over a ground surface;
wherein the metering unit includes a roller disposed substantially transversely to the flow of the material ingredients from the other material ingredient hopper, the roller including a plurality of spaces positioned about the periphery of the roller for receiving the material ingredients to be discharged from its associated material ingredient hopper, the spaces being sized and spaced about the roller so as to provide uniform and constant discharge of the material ingredients from the spaces onto the flow of the material ingredients from the other material ingredient hopper.

22. The system of claim 21, wherein the broadcasting device includes means for variably adjusting the rate of distribution of material ingredients therefrom.

23. The system of claim 21, having at least three material ingredient hoppers arranged to discharge material ingredients therefrom onto the conveyor wherein at least two of the material ingredient hoppers each has associated therewith a metering unit that includes a roller disposed substantially transversely to the flow of the material ingredients from the other material ingredient hopper, each roller having a plurality of spaces positioned about the periphery of the roller for receiving the material ingredients to be discharged from its associated material ingredient hopper, the spaces being sized and spaced about the roller so as to provide uniform and constant discharge of the material ingredients from the spaces onto the flow of the material ingredients from the other material ingredient hopper.

24. The system of claim 23, wherein the hoppers are arranged longitudinally one after the other above and along the conveyor.

25. The system of claim 23, further including means for independently adjusting the speed of individual rotation of each of the rollers.

26. The system of claim 23, wherein the roller is rotated about a longitudinal axis and the discharge of material ingredients from the spaces begins at a point above the longitudinal axis.

27. The system of claim 21, wherein the spaces of the roller are sized and spaced apart so as to meter material ingredients therefrom at or below 75 lbs/ acre.

28. The system of claim 21, wherein the spaces of the roller are sized and spaced so as to meter material ingredients therefrom at or below 20 lbs/ acre.

29. The system of claim 21, wherein the spaces are longitudinally positioned about the roller such that a first group of spaces gradually discharges its contents as the roller is rotated about a longitudinal axis disposed substantially transversely of the conveyor and before the first group of spaces has completely discharged its material ingredients, a second group of spaces has begun to discharge its material ingredients.

30. The system of claim 29, wherein the spaces have a concave radial shape.

31. The system of claim 29, wherein the roller delivers a uniform level of material ingredients onto the take away conveyor.

32. The system of claim 21, wherein the roller is rotated about a longitudinal axis and the discharge of material ingredients from the spaces begins at a point above the longitudinal axis.

33. A plural bin metering system for broadcasting material ingredients contained therein over a ground surface comprising
  at least two material ingredient hoppers, each of the hoppers having a material ingredient discharge port; at least one of the material ingredient hoppers having a variably controllable metering unit associated therewith for variably controlling the discharge of material ingredients therefrom independently from the rate of discharge of material ingredients from an other material ingredient hopper, the other material ingredient hopper providing a flow of the material ingredients through the system;
  a conveyor disposed below the other material ingredient hopper for receiving material ingredients discharged from the other material ingredient hopper;
  and a material ingredient broadcasting device disposed off of one end of the conveyor for receiving material ingredients conveyed thereon, and broadcasting the material ingredients over a ground surface;
  wherein the metering unit includes a roller disposed substantially transversely to the flow of the material ingredients from the other material ingredient hopper, the roller having a plurality of spaces positioned about the periphery of the roller for receiving the material ingredients to be discharged from its associated material ingredient hopper and discharging the material ingredients onto the flow of the material ingredients from the other material ingredient hopper, and the metering unit including a transition box having walls for diverting the material ingredients towards the roller, at least one of the walls further including a device to wipe the surface of the roller as the roller rotates within the metering unit.

34. The system of claim 33, wherein the device to wipe the surface of the roller is a brush.

35. The system of claim 33, wherein the device to wipe the surface of the roller is a rubber or a plastic strip.

36. The system of claim 33, having at least three material ingredient hoppers arranged to discharge material ingredients therefrom onto the conveyor wherein at least two of the material ingredient hoppers each has associated therewith a metering unit that includes a roller disposed substantially transversely to the flow of the material ingredients from the other material ingredient hopper, each roller having a plurality of spaces positioned about the periphery of the roller for receiving the material ingredients to be discharged from its associated material ingredient hopper, the spaces being sized and spaced about the roller so as to provide uniform and constant discharge of the material ingredients from the spaces onto the flow of the material ingredients from the other material ingredient hopper.

37. The system of claim 36, wherein the hoppers are arranged longitudinally one after the other above and along the conveyor.

38. The system of claim 33, wherein the spaces of the roller are sized and spaced apart so as to meter material ingredients therefrom at or below 75 lbs/ acre.

39. The system of claim 33, wherein the spaces are longitudinally positioned about the roller such that a first group of spaces gradually discharges its contents as the roller is rotated about a longitudinal axis disposed substantially transversely of the conveyor and before the first group of spaces has completely discharged its material ingredients, a second group of spaces has begun to discharge its material ingredients so as to provide uniform and constant discharge of the material ingredients from the recesses onto the conveyor.

40. The system of claim 39, wherein the roller is rotated about a longitudinal axis and the discharge of material ingredients from the spaces begins at a point above the longitudinal axis.

* * * * *